United States Patent [19]

Scranton

[11] 4,237,466

[45] Dec. 2, 1980

[54] PAPER TRANSPORT SYSTEM FOR AN INK JET PRINTER

[75] Inventor: Robert J. Scranton, Dayton, Ohio

[73] Assignee: The Mead Corporation, Dayton, Ohio

[21] Appl. No.: 36,886

[22] Filed: May 7, 1979

[51] Int. Cl.[3] .......................... B65H 7/06; H04N 1/22; G01D 15/16

[52] U.S. Cl. .............................. 346/75; 101/382 MV; 271/4; 271/276; 271/312; 346/134; 400/126; 400/644

[58] Field of Search ........... 101/232, 382 MV; 271/3, 271/4, 196, 276, 307, 308, 312, 313, DIG. 2; 355/14 SH; 358/296; 400/126, 624, 625, 627, 628, 629, 602, 644; 346/75, 134

[56] References Cited

U.S. PATENT DOCUMENTS

| | | | |
|---|---|---|---|
| 2,365,294 | 12/1944 | Sanford | 101/232 |
| 3,076,649 | 2/1963 | Stevenson | 271/307 |
| 3,431,139 | 3/1969 | Stroszynski | 271/94 X |
| 3,545,746 | 12/1970 | Ledger et al. | 271/196 |
| 3,593,065 | 7/1971 | Domalski et al. | 361/175 |
| 3,845,951 | 6/1973 | Hamaker | 271/196 X |
| 4,030,409 | 6/1977 | Adhikari et al. | 101/233 X |
| 4,033,575 | 7/1977 | Fujimoto | 271/3 |
| 4,047,085 | 9/1977 | Ollendick | 400/126 X |
| 4,101,018 | 7/1978 | Sokolowski | 101/235 X |
| 4,106,061 | 8/1978 | Burnett | 358/296 |

*Primary Examiner*—Paul T. Sewell

*Attorney, Agent, or Firm*—Biebel, French & Nauman

[57] ABSTRACT

An ink jet printer includes a rotatable support for supporting a sheet of paper. The support defines an interior vacuum chamber and a plurality of vacuum openings in the surface thereof which communicate with the vacuum chamber. A rotary drive rotates the support and a vacuum source is provided for partially evacuating the vacuum chamber. A paper supply adjacent the rotatable support, loads a sheet of paper onto the rotatable support. An ink jet print head is mounted adjacent the rotatable support for printing on a sheet of paper supported thereon. A sheet diverter is positioned adjacent the rotatable support between the ink jet print head and the paper supply for stripping sheets of paper from the rotatable support when the sheets are not firmly supported thereon. A paper sensor is mounted adjacent the rotatable support, intermediate the sheet diverter and the ink jet print head, for inhibiting operation of the ink jet print head when a sheet of paper is diverted by the paper diverter. The rotatable support comprises a cylindrical paper supporting drum which defines the vacuum openings, which openings are positioned about the periphery of the drum. A leading edge engaging area on the drum periphery is defined by a number of the vacuum openings, with the openings in the leading edge engaging area providing a sheet attracting suction to each sheet adjacent the leading edge of the sheet as the sheet is loaded onto the drum.

14 Claims, 4 Drawing Figures

PAPER TRANSPORT SYSTEM FOR AN INK JET PRINTER

BACKGROUND OF THE INVENTION

The present invention relates to apparatus for handling sheets of print receiving material during a print operation and, more particularly, to a paper handling system for an ink jet printer in which sheets of print receiving medium are successively loaded onto a sheet supporting drum which is rotated adjacent a print head. The sheets are held on the drum by vacuum applied to an interior vacuum cavity in the drum which communicates with vacuum openings in the drum surface.

Such a printer is disclosed in U.S. Pat. No. 4,106,061, issued Aug. 8, 1978, to Burnett. The Burnett patent discloses a paper supporting drum upon which is mounted a sheet of copy paper. The drum has associated therewith an ink jet printer which is moved parallel to the axis of rotation of the drum during a plurality of drum rotations as scanning is performed in a corresponding manner across an original document. A plurality of vacuum belts cooperate with evacuated chambers beneath the belts to transfer copy paper from a supply tray to the drum for printing and, after the printing operation is completed, to transfer the printed copies to a storage tray. Printing is accomplished during a plurality of rotations of the paper supporting drum during which time the ink jet printer prints in a helically interlaced pattern on the copy paper.

In a number of prior art printers or copiers, copy paper is mounted on a rotating drum during printing by means of a mechanical sheet engaging mechanism which grips one or more of the edges of the sheet of copy paper. Such an arrangement is shown in U.S. Pat. No. 4,033,575, issued July 5, 1977, to Fujimoto. Although the mechanical sheet grippers provide positive location of the sheet of copy paper on the drum, such mechanical sheet engaging arrangements are necessarily limited in operating speed and may also be relatively complicated and subject to wear and malfunction. Additionally, such arrangements are susceptible of improper operation with the result that one or more sheets of copy paper may become jammed in the mechanism, requiring operator intervention for removal of the sheets.

The use of drums defining vacuum openings in the periphery thereof for engaging a sheet of copy paper by means of a sheet engaging suction is shown in a number of prior art references including U.S. Pat. No. 4,101,018, issued July 18, 1978, to Sokolowski. In the Sokolowski patent, a paper engaging drum defines a plurality of suction openings which are spaced uniformly about the periphery of the drum. The drum is sized such that the trailing edge of a sheet of paper loaded thereon overlaps the leading edge slightly. A photo-optical sensor arrangement senses this overlap in order to provide control signals to the printer such that the image is printed on the sheet of paper in proper registration. The sensor arrangement is required in the Sokolowski device since positioning of a sheet of paper at a precisely defined position on the vacuum drum is not possible.

U.S. Pat. No. 3,845,951, issued Nov. 5, 1974, to Hamaker, discloses a vacuum roller having a coating of compressible porous material which defines a registration ridge extending axially along the roller surface. A sheet of paper is transferred into contact with the roller such that the leading edge abuts this ridge. This arrangement provides for positive registration of the sheet on the roller. Such a roller is not acceptable as a support for a sheet of copy paper during printing with an ink jet printer, however, since the locating ridge would contact the printer as it is rotated therepast.

Accordingly, it is seen that there is a need for a vacuum drum mounting arrangement for supporting a sheet of copy paper as an image is printed on the sheet with an ink jet printer in which registration of the sheet of paper on the drum is assured and in which the sheet of paper is removed from the drum when improperly positioned on the drum or when the drum vacuum is lost.

SUMMARY OF THE INVENTION

An ink jet printer includes a rotatable support means for supporting a sheet of paper. The support means defines an interior vacuum chamber and a plurality of vacuum openings in the surface of the support means which communicate with the chamber. A rotary drive means rotates the support means and a vacuum source means provides partial evacuation of the interior vacuum chamber. A paper supply means, adjacent the rotatable support means, loads a sheet of paper onto the rotatable support means. An ink jet print head is mounted adjacent the rotatable support means for printing on a sheet of paper supported thereon. A sheet diverter means is positioned adjacent the rotatable support means, between the ink jet print head and the paper supply means, for stripping a sheet of paper from the rotatable support means if the sheet is not firmly supported thereon. A paper sensor means is mounted adjacent the rotatable support means, intermediate the sheet diverter means and the ink jet print head, for inhibiting operating of the ink jet print head when a sheet of paper is diverted by the paper diverter means.

The rotatable support means may comprise a cylindrical paper supporting drum which defines a plurality of vacuum openings positioned about the periphery of the drum. A leading edge engaging area on the drum is defined by a number of vacuum openings, with the openings in this area providing a sheet attracting suction to each sheet adjacent the leading edge of the sheet of paper as the sheet is loaded onto the drum. The openings in the leading edge engaging area supply a substantially greater sheet attracting suction to a sheet than is applied to the sheet by the others of the vacuum openings defined in the periphery of the drum. By this arrangement, a sheet of paper supplied to the drum at other than the proper time for loading thereon is not firmly engaged adjacent its leading edge and tends to separate from the drum such that the leading edge of the sheet contacts the sheet diverter means and is removed thereby from the drum.

The sheet diverter means may comprise a stationary diverter bar extending substantially parallel to the axis of rotation of the rotatable support means and spaced away from the surface of the rotatable support means by a predetermined uniform clearance. The leading edge of a sheet of paper not firmly engaged by the rotatable support means therefore contacts the bar and is stripped from the rotatable support means. The diverter bar defines a sharp edge adjacent the surface of the rotatable support means and spaced therefrom by the predetermined uniform clearance. The diverter bar further defines a paper diverting surface which extends away from the sharp edge and outward from the rotatable support means for directing paper diverted by the bar away from the rotatable support means. A paper receiving tray may be positioned adjacent the diverter bar for receiving sheets of paper removed by the bar from the rotatable support means.

Accordingly, it is an object of the present invention to provide a paper handling arrangement for loading a sheet of paper onto a rotating drum and holding the paper on the drum by means of vacuum supplied to an internal vacuum cavity within the drum, which vacuum is applied to the sheet via suction openings in the drum; to provide such a paper handling system in which a paper diverter bar is fixed in a position adjacent the drum for stripping a sheet of paper from the drum in the event that vacuum to the drum is interrupted; to provide such a system in which the drum defines a plurality of suction openings; including openings grouped in a leading edge area of the drum, which openings engage a portion of the sheet adjacent the leading edge of the sheet; to provide such a paper handling system in which a sheet of paper supplied to the drum at an inappropriate time is not firmly held on the drum, thereby permitting the sheet to be removed from the drum by the paper diverter bar; and to provide such a system including an ink jet print head for printing on a sheet of paper positioned on the drum.

Other objects and advantages of the invention will be apparent from the following description, the accompanying drawings and the appended claims.

DETAILED DESCRIPTION OF THE PREFERRED EMBODIMENTS

Figure 1:
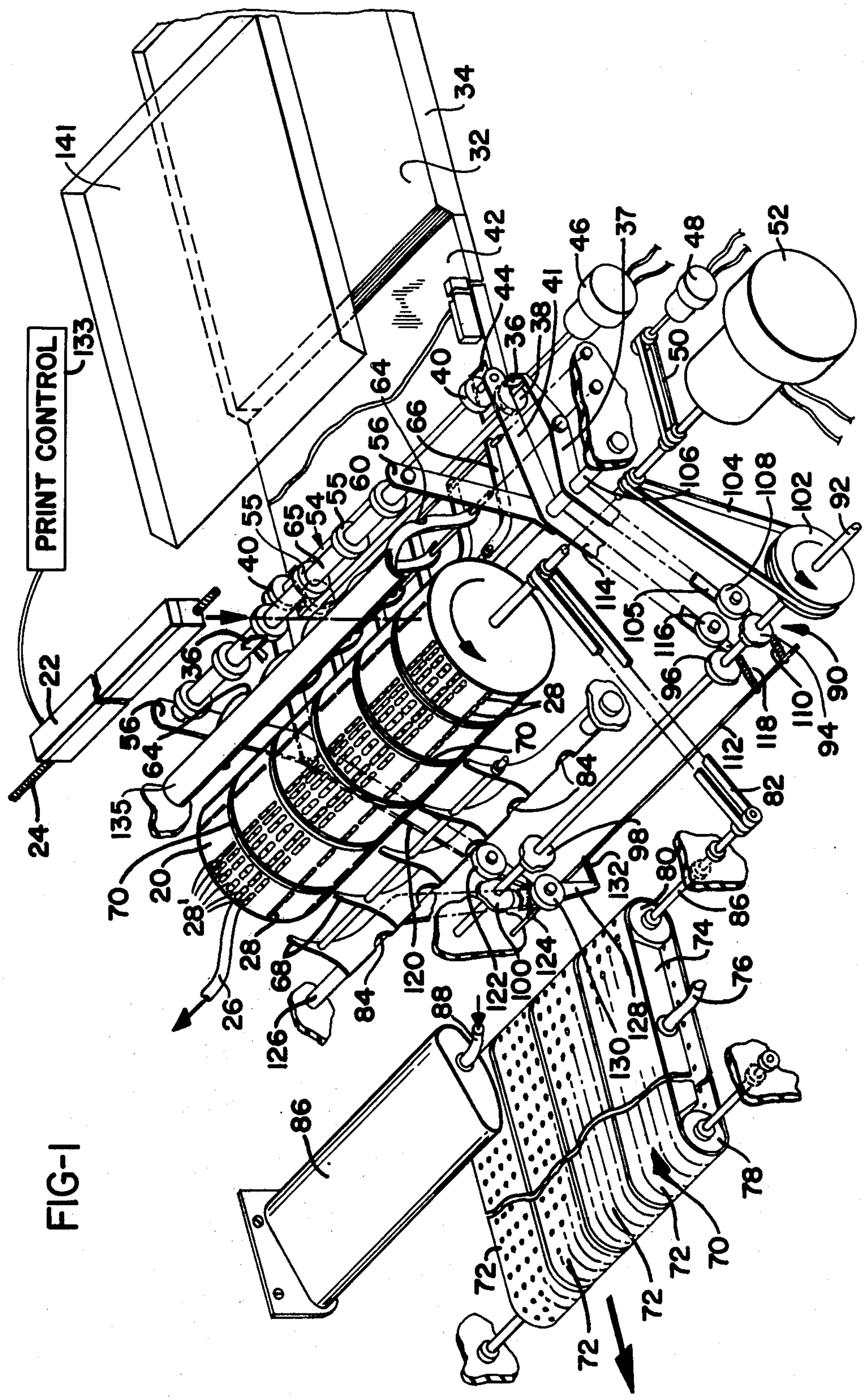
FIG. 1 is an exploded perspective view of the ink jet printer and paper handling system of the present invention, with portions broken away and removed.
Figure 2:
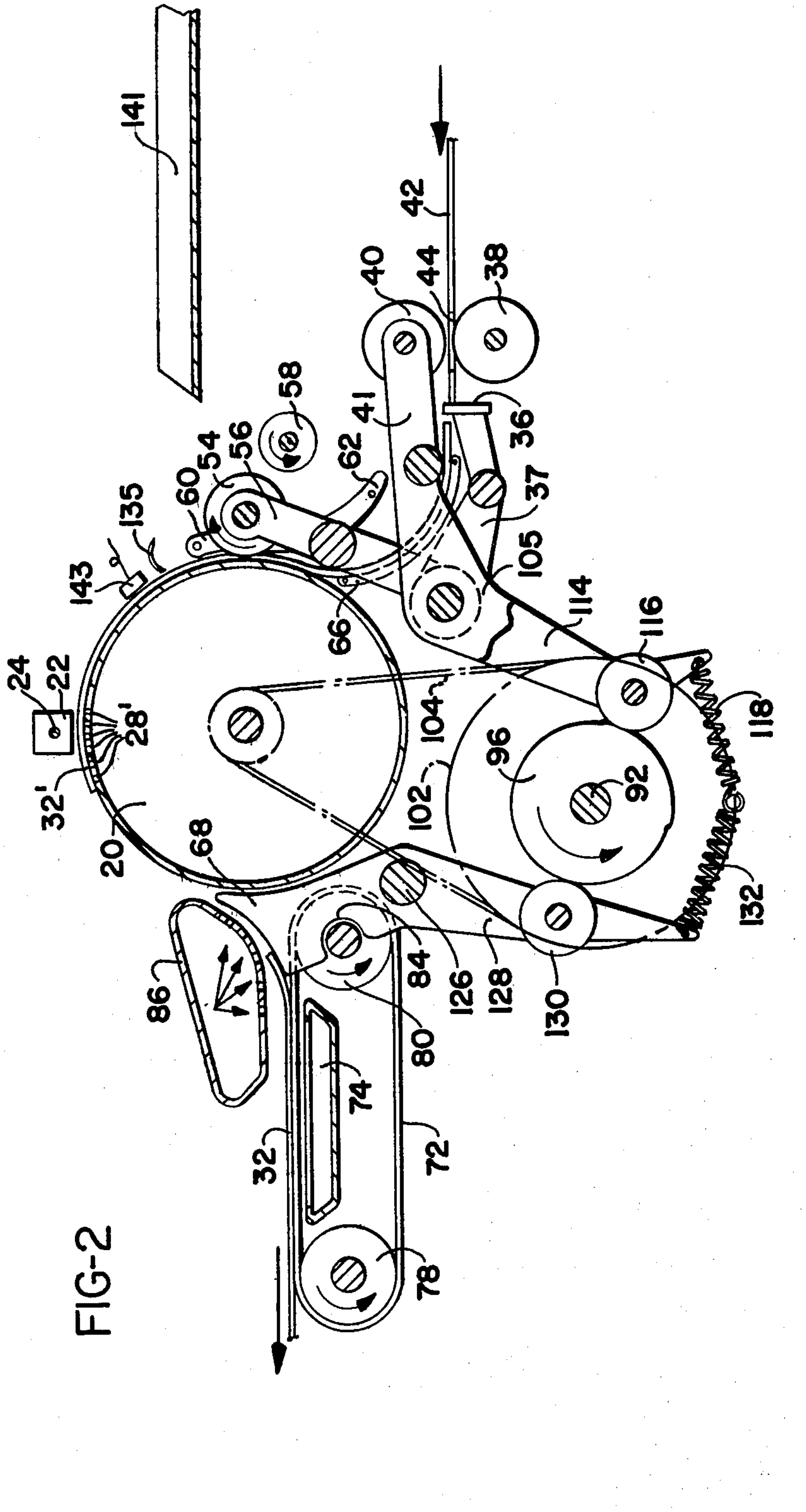
FIG. 2 is a side view of the printer and paper handling system of FIG. 1, with portions broken away and in section, illustrating loading a sheet of paper onto the drum.

Reference is now made to FIGS. 1 and 2 which illustrate the printer and paper handling system of the present invention. A rotatable support means for supporting a sheet of print receiving material, such as copy paper, comprises a rotatable support means including cylindrical paper support drum 20. Drum 20, mounted for rotation adjacent ink jet print head 22, supports a sheet of paper during a plurality of rotations as the print head 22 deposits ink drops along print lines on the paper. During printing, the print head 22 is moved in a direction parallel to the axis of rotation of the drum 20 by means of a threaded rod 24, such that a plurality of helical print lines on the paper are printed to provide complete print coverage across the width of the paper. Other alternative arrangements may be provided for moving the print head 22 during printing.

Drum 20 defines an interior vacuum chamber or cavity which communicate with a vacuum line 26 and a plurality of vacuum or suction openings 28 in the periphery of drum 20 in order to hold a sheet of copy paper on the drum 20 securely by means of the vacuum.

The drum defines a plurality of vacuum openings 28' which are positioned within a leading edge engaging area on the drum. Openings 28' provide for engagement of a sheet by supplying a sheet attracting suction to an area on the sheet adjacent the leading edge of the sheet of paper as the sheet is loaded onto the drum 20. This is illustrated in FIG. 2.

A paper supply means is provided for loading a sheet of paper 32 stored in tray 34 onto the drum 20. A sheet of paper is delivered by a sheet supply arrangement (not shown) of conventional design to a position defined by a pair of paper stops 36 which engage the leading edge of the sheet. Paper stops 36 at the ends of arms 37 are positioned between a pair of supply rollers 38 and 40 and drum 20. Supply rollers 38 and 40 are initially positioned apart and at the appropriate time supply roller 40, rotatably mounted on the ends of arms 41, is lowered such that a sheet of paper is pinched between roller 40 and roller 38. In order to provide for engagement of a sheet of paper between the paper supply rollers 38 and 40, paper supporting plate 42 defines a pair of slots 44 therein. Motor 46 is connected to the supply roller 38 such that roller 38 may be rotated at an appropriate time to transport a sheet of paper 32 toward the drum 20. Timing information for actuating the motor 46 is provided by tachometer 48 which is driven by belt 50 from the shaft of motor 52. Motor 52 provides a rotary drive means for rotating the drum 20. Simultaneously with the engagement of a sheet of paper by rollers 38 and 40, the paper stops 36 are moved out of their respective sheet engaging positions to permit movement of a sheet of paper therepast.

A drum contacting roller 54 having a plurality of roller wheels 55 mounted on roller support arms 56 is provided for movement into contact with the drum 20. Roller 54 is moved into such contact with drum 20 to press a sheet of paper 32 against the drum 20 as the sheet is loaded onto the drum 20, as illustrated in FIG. 2. A continuously driven roller 58, shown only in FIG. 2 for clarity of illustration, provides a means for rotating the drum contacting roller 54 when the roller 54 is out of engagement with the drum 20. The rotational velocity of roller 58 is such that the roller 54 has a tangential velocity when out of contact with drum 20 which is substantially the same as the tangential velocity of the paper supporting drum 20.

A paper guide, including guide fingers 60, is provided to deflect a sheet of paper 32 as it is fed onto the drum 20. Fingers 60 are pivotably mounted on shaft 62 and each includes a notch 64 dimensioned to receive the shaft 65 of roller 54. Fingers 60 may be pivoted away from the drum 20 to permit the removal of paper from the apparatus, should jamming occur.

A fixed sheet guide includes fingers 66 for deflecting a sheet, transported toward the drum by supply rollers 38 and 40, into a path which is substantially tangential to the periphery of the drum 20.

A paper ejector means is provided for removing a sheet of paper from the support drum 20 as the printing operation on the sheet of paper is being completed. The paper ejector means includes a plurality of paper removal fingers 68 which are movable into engagement with circumferential grooves 70 defined in the periphery of the drum 20. A sheet of paper 32' is stripped from the drum 20, notwithstanding the maintenance of a partial vacuum within the vacuum chamber in drum 20.

A vacuum belt transport 70 includes a plurality of porous belts 72 which cooperate with an evacuated plenum 74 having a partial vacuum maintained therein by means of a vacuum source communicating therewith via vacuum tube 76. Rollers 78 and 80 support the vacuum belts 72 with roller 80 being driven by belt 82 such that a sheet of paper is transported by the belts 72 at a velocity substantially equal to the tangential velocity of the periphery of the paper supporting drum 20. Alternatively, the velocity of belts 72 may be slightly less than the tangential velocity of the periphery of the paper supporting drum, with the speed differential being taken up by the sheet of paper bowing downward and slipping with respect to the belts 72. Each of the paper removal fingers 68 includes a cut out portion 84 which partially surrounds the shaft 86 of roller 80 when the fingers 68 are retracted out of engagement with the grooves 70, as illustrated in FIG. 2. Pressurized chamber 86 is connected to a source of pressurized air via tube 88 which provides a means for directing air against each sheet of paper as the sheet is removed from the drum thus urging each sheet against the fingers 68 and against the belt transport 70.

A control means is provided for controlling operation of the paper supply means and the paper ejector means such that as a sheet of paper is removed, after a plurality of rotations on the drum 20 during which printing is effectuated, another sheet is concurrently loaded onto the drum 20. This minimizes the effect of the loading and unloading cycles on the overall speed of the printer since printing will occur during at least a portion of these cycles.

Control of the paper supply means and the paper ejector is provided by a cam means 90 which includes a cam shaft 92 upon which cams 94, 96, 98, and 100 are mounted. Shaft 92 is rotated by means of pulley 102 and belt 104 at a rotational velocity directly proportional to the rotational velocity of the rotatable support means. The size of pulley 102 is selected such that it provides a driving connection between the cam means 90 and the rotary drive means 52 which provides for one rotation of the cam means for each plurality of rotations of the drum 20 necessary for complete printing of a sheet of paper. Thus in an embodiment in which a sheet of paper is completely printed after four rotations of the drum 20, the cam shaft 92 will be driven at one-fourth the rotational rate of the drum 20.

Each of the cams 94, 96, 98, and 100 defines camming surfaces, the contours of which control the sequence of actuation of the various elements of the paper supply and ejector arrangement. Paper supply cam follower means are provided for contacting the camming surfaces as the cam means is rotated, for moving the pair of paper supply rollers 38 and 40, the paper stop 36, and the drum contacting roller 54, such that each engages a sheet of paper 32 at appropriate times to load the sheet onto the sheet supporting drum 20.

Specifically, arm 105, pivotable about shaft 106, has a cam follower roller 108 pivotally mounted thereon and is urged against cam 94 by spring 110, attached to the bottom of arm 105 and to rod 112. As cam 94 is rotated, the camming surface defined thereby pivots arm 105 such that the paper stop 36 is raised and lowered at appropriate times during the print cycle of the printer.

Arm 114, pivotally mounted upon shaft 106, has a cam follower roller 116 pivotally mounted thereon. Roller 116 is urged against cam 96 by means of spring 118 and controls pivoting of arm 41 and movement of roller 40 into engagement with supply roller 38.

Arm 120 is pivotally mounted on shaft 106 and controls pivoting of roller 54 into contact with drum 20. Arm 120 has rotatably mounted thereon cam follower roller 122 which is urged into engagement with the camming surface of cam 100 by spring 124.

In a similar fashion, the pivoting of fingers 68 about shaft 126 into engagement with grooves 70 in drum 20 is controlled by the movement of arm 128. Cam follower roller 130 is rotatably mounted on arm 128 and is urged into engagement with cam 98 by spring 132. It may be seen, therefore, that since each of the cams 94, 96, 98, and 100, complete only one revolution during the plurality of revolutions of the sheet supporting drum 20 required for printing, all of the required actuations of the paper supply and ejector elements may be provided with the appropriately shaped camming surfaces.

A print control 133 of known design provides print control signals to ink jet print head 22. The print control signals may be derived in one of several ways, including computer generation of the characters forming a text to be printed. Alternatively, print control signals may be derived from an optical scanner which scans an original document and generates appropriate control signals for reproduction of the document. Print control 133 receives tachometer output pulses from tachometer 48 and generates control signals controlling operation of motors 46 and 52. The sequence of steps performed by the paper handling system during normal loading and unloading of a sheet of paper 32′ onto and off of the drum 20 during printing is more completely described in copending U.S. application, Ser. No. 007,999, filed Jan. 31, 1979.

It will be appreciated that problems may arise in loading the sheet of paper onto the drum 20 when, for some reason, vacuum to the drum is temporarily lost. In such a case, the sheet attracting suction normally provided through suction openings 28′ is discontinued. If no further provision were made for this situation, the sheet would fly away from the drum 20, possibly becoming jammed in a portion of the paper handling system and necessitating disassembly of the system for removal of the sheet. An additional problem arises if, for some reason, paper is not supplied to the drum 20 at the appropriate time during the rotation cycle of the drum. In such a case, the sheet of paper might be loaded onto the drum such that it would not be properly positioned for printing. The printed image might therefore be positioned too high or too low with respect to the sheet of copy paper and, additionally, ink might be deposited upon the drum 20 in the area between the top and bottom edges of the sheet.

Figure 4:
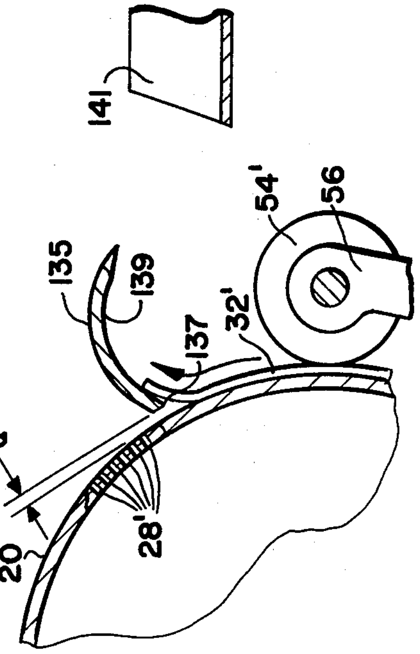
FIG. 4 is an enlarged view, similar to FIG. 3, showing the operation of the diverter bar in greater detail.

In order to eliminate such problems, a sheet diverter means, including a stationary diverter bar 135, is positioned such that it extends substantially parallel to the axis of rotation of the drum 20. As seen in FIG. 4, the bar 135 is spaced away from the surface of the drum 20 by a distance d which provides a predetermined uniform clearance to permit a sheet of paper, properly mounted, to be rotated without interference beneath the bar 135. It has been found that the distance d may be between 0.01 and 0.015 inches.

Figure 3:
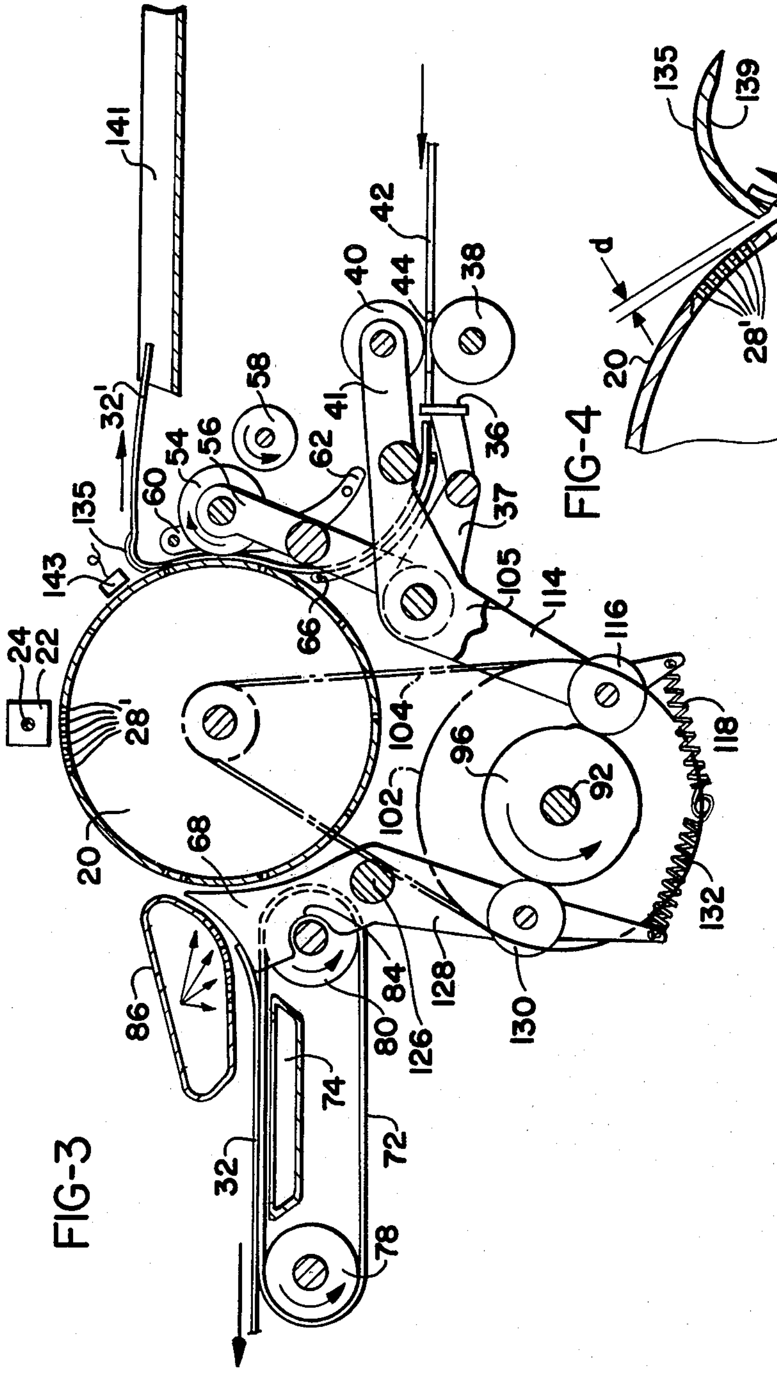
FIG. 3 is a view, similar to FIG. 2, illustrating the sheet stripping action of the diverter bar.

As seen in FIG. 2, when the sheet of paper 32′ is supplied to the drum 20 at the proper time, the area of the sheet adjacent the leading edge thereof is engaged by suction openings 28′. This grouping of openings supplies substantial suction to this portion of the sheet thereby assuring that it is firmly engaged by the drum. Should suction to the drum 20 be interrupted during the application of a sheet to the drum, or should the sheet be delivered to the drum by the paper supply at a point in time earlier or later than required for proper positioning upon the drum, the sheet will tend to fly away from the drum as illustrated in FIGS. 3 and 4. The deflector bar 135 defines a sharp edge 137 adjacent the surface of the drum 20 and a paper diverting surface 139 extending away from the sharp edge 137 and outward from the drum 20. The sheet of paper 32' therefore contacts the diverter bar 135 and is stripped away from the drum 20.

As shown in FIG. 3, the sheet of paper 32' is thereafter directed toward a paper receiving tray 141 which receives sheets of paper removed by the bar 135 from the drum 20. Another sheet of paper may then be supplied to the drum and normal printer operation may be resumed without the need for removing a jammed sheet from the paper handling arrangement. As shown in FIGS. 3 and 4, the sheet of paper 32' is held between the roller and rotating drum 20 such that it is transported upward and directed outward by the bar 135, even when the sheet 32' is not attracted to the drum 20 by the usual sheet attracting suction.

A paper sensor means, such as sensor 143, is mounted adjacent the drum 20, intermediate the diverter bar 135 and the ink jet print head 22, for inhibiting operation of the print head 22 when a sheet of paper is diverted by the paper diverter means. Sensor 143 is needed to prevent ink from being deposited upon the drum 20 when no sheet is loaded onto the drum. Sensor 143 provides an appropriate control signal to the print control 133 to effect such inhibition of the printer. If a pair of sensors are provided, these may also be utilized to detect loading of a sheet onto the drum in a skewed orientation. Sensor 143 may comprise any one of a number of conventional paper sensors, such as photodiode sensors which sense the difference in reflectivity between the drum surface and the surface of a sheet of paper mounted upon the drum.

While the form of apparatus herein described constitutes a preferred embodiment of the invention, it is to be understood that the invention is not limited to this precise form of apparatus, and that changes may be made therein without departing from the scope of the invention.

What is claimed is:

1. An ink jet printer, comprising:

rotatable support means for supporting a sheet of paper, said support means defining an interior vacuum chamber and a plurality of vacuum openings in the surface of said support means communicating with said chamber, rotary drive means for rotating said support means, vacuum source means for partially evacuating said interior vacuum chamber in said rotatable support means, paper supply means, adjacent said rotatable support means, for loading a sheet of paper onto said rotatable support means, an ink jet print head, mounted adjacent said rotatable support means, for printing on a sheet of paper supported on said rotatable support means, sheet diverter means, positioned adjacent said rotatable support means beween said ink jet print head and said paper supply means, for stripping a sheet of paper from said rotatable support means if the sheet is not firmly supported thereon, and paper sensor means mounted adjacent said rotatable support means, intermediate said sheet diverter means and said ink jet print head, for inhibiting operation of said ink jet print head when a sheet of paper is diverted by said paper diverter means.

2. The ink jet printer of claim 1 in which said rotatable support means comprises a cylindrical paper supporting drum defining a plurality of vacuum openings positioned about the periphery of said drum, with a leading edge engaging area on the periphery of said drum defined by a number of said plurality of vacuum openings, the openings in said leading edge engaging area providing a sheet attracting suction to a sheet adjacent the leading edge of the sheet of paper as the sheet is loaded onto said drum.

3. The ink jet printer of claim 2 in which the openings in said leading edge engaging area supply a substantially greater sheet attracting suction to a sheet adjacent the leading edge thereof than is applied to the sheet by the others of said vacuum openings defined in the periphery of said drum, whereby a sheet of paper supplied to said drum at other than the proper time for loading a sheet thereon is not firmly engaged adjacent its leading edge such that said leading edge contacts said sheet diverter means and said sheet is removed from said drum.

4. The ink jet printer of claim 1 in which said sheet diverter means comprises a stationary diverter bar extending substantially parallel to the axis of rotation of said rotatable support means and spaced away from the surface of said rotatable support means by a predetermined uniform clearance such that the leading edge of a sheet of paper not firmly engaged by said rotatable support means contacts said bar and is stripped from said rotatable support means.

5. The ink jet printer of claim 4 in which said diverter bar defines a sharp edge adjacent the surface of said rotatable support means and spaced therefrom by said predetermined uniform clearance.

6. The ink jet printer of claim 5 in which said diverter bar further defines a paper diverting surface extending away from said sharp edge and outward from said rotatable support means for directing paper diverted by said bar away from said rotatable support means.

7. The ink jet printer of claim 6 further comprising a paper receiving tray positioned adjacent said diverter bar for receiving sheets of paper removed by said bar from said rotatable support means.

8. A paper handling system for delivering a sheet of paper to a rotatable paper support drum and mounting said sheet securely thereon in a predetermined position, comprising:

a cylindrical paper support drum for supporting a sheet of paper, said drum defining an interior vacuum cavity and a plurality of suction openings in the surface of said drum communicating with said vacuum cavity, said suction openings being positioned in a leading edge engaging area of the drum surface and supplying a sheet attracting suction to engage an area of a sheet adjacent the leading edge of the sheet, vacuum source means for partially evacuating said interior vacuum cavity in said drum, rotary drive means for continuously rotating said cylindrical paper support drum about its axis, sheet supply means for transporting a sheet of paper into substantially tangential contact with the periphery of said support means such that the suction openings in said rotatable support means provide a sheet attracting suction to an area of the sheet adjacent the leading edge of the sheet as said sheet is wrapped around said drum, and stationary sheet diverter means positioned adjacent the surface of said drum and spaced therefrom by a predetermined clearance, for stripping a sheet from the drum when the sheet is improperly positioned such that the area of the sheet adjacent the leading edge thereof does not receive a sheet attracting suction via said suction openings.

9. The paper handling system of claim 8 in which drum defines additional suction openings communicating with said vacuum cavity for engaging areas of said sheet other than the area adjacent said leading edge.

10. The paper handling system of claim 9 in which said suction openings in said leading edge engaging area supply a substantially greater sheet attracting suction to a sheet adjacent the leading edge thereof than is applied to the sheet by the others of said vacuum openings defined in the surface of said drum, whereby a sheet of paper supplied to said drum at other than the proper time for loading a sheet thereon is not firmly engaged adjacent its leading edge such that said leading edge contacts said sheet diverter means and said sheet is removed from said rotatable support means.

11. The paper handling system of claim 8 in which said sheet diverter means comprises a stationary diverter bar extending substantially parallel to the axis of rotation of said drum and spaced away from the surface of said drum by a predetermined uniform clearance such that the leading edge of a sheet of paper not firmly engaged by said drum contacts said bar and is stripped therefrom.

12. The paper handling system of claim 11 in which said diverter bar defines a sharp edge adjacent the surface of said drum and spaced therefrom by said predetermined uniform clearance.

13. The paper handling system of claim 12 in which said diverter bar further defines a paper diverting surface extending away from said sharp edge and outward from said drum for directing paper diverted by said bar away from said rotatable support means.

14. The paper handling system of claim 13 further comprising a paper receiving tray positioned adjacent said diverter bar for receiving sheets of paper removed by said bar from said drum.

* * * * *